United States Patent [19]

Sinha et al.

[11] Patent Number: 4,622,855
[45] Date of Patent: Nov. 18, 1986

[54] LOW THERMAL RESPONSE TIME SURFACE ACOUSTIC WAVE SENSORS

[75] Inventors: Bikash K. Sinha, West Redding; Stanley Locke, Norwalk, both of Conn.

[73] Assignee: Schlumberger Technology Corporation, New York, N.Y.

[21] Appl. No.: 687,716

[22] Filed: Dec. 31, 1984

[51] Int. Cl.4 ............................................. G01L 11/00
[52] U.S. Cl. ...................................... 73/703; 73/708; 73/729; 73/DIG. 4; 310/313 B; 310/338
[58] Field of Search .......... 73/703, 708, 723, DIG. 4, 73/729; 310/313 B, 338; 29/25.35

[56] References Cited

U.S. PATENT DOCUMENTS

4,361,050 11/1982 Coussot ............................ 73/861.47
4,535,631 8/1985 Sinha et al. .......................... 73/703

Primary Examiner—Donald O. Woodiel
Attorney, Agent, or Firm—Cooper, Dunham, Griffin & Moran

[57] ABSTRACT

Disclosed is an externally loaded pressure sensor using a pair of SAW devices formed on the wall of an interior cavity. The difference frequency of these devices is used as a temperature-compensated measure of hydrostatic pressure on the sensor exterior. The termal response time of the sensor is shortened by matching to each other the sensor wall thicknesses adjacent the two SAW devices, e.g., by making these wall thicknesses approximately the same by means of forming an external flat on the sensor body.

18 Claims, 24 Drawing Figures

LOW THERMAL RESPONSE TIME SURFACE ACOUSTIC WAVE SENSORS

BACKGROUND AND SUMMARY OF THE INVENTION

The invention relates to sensors employing surface acoustic wave ("SAW") devices. An important aspect of the invention relates to using SAW devices to measure pressure, such as hydrostatic pressure.

Sensors employing SAW devices (such as delay lines and resonators), have been proposed for use in measuring parameters such as acceleration and pressure. SAW sensors rely on the propagation of acoustic waves in media which respond to external influences the effect of which changes SAW characteristics such as wave velocity or frequency. In one prior proposal, a SAW device is on a thin diaphragm mounted so as to flex under the external influences to be measured and thereby change the characteristics of the SAW device in a way which can be measured. Another type of a previously proposed sensor structure uses a cylindrical body as an externally loaded or an internally loaded probe. For an externally loaded structure, the body has a sealed cavity, with one or more SAW devices mounted on the interior surface. When external pressure is applied, the body flexes and changes the SAW device characteristics. For an internally loaded structure, one or more SAW devices are on the exterior surface of the cylindrical body, and outward pressure is applied at a central opening in the cylinder. A detailed description of surface acoustic wave sensors can be found in commonly assigned co-pending application Ser. No. 427,240 filed on Sept. 29, 1982 now U.S. Pat. No. No. 4,535,631. The entire contents of said 1982 application are hereby incorporated by reference herein, and the prior art discussed or cited in said 1982 application is hereby brought to the attention of the Examiner herein. Improvements of such devices are disclosed in commonly owned application Ser. No. 687,715 filed concurrently herewith, the entire contents of which are hereby incorporated by reference herein, and the prior art discussed or cited in which is hereby brought to the attention of the Examiner.

One way of making externally loaded structures is to start with a solid cylinder of a material such as crystalline quartz, saw it in half along an axial plane and rout the flat sides of the halves to form channels with respective "flats" at their bottoms. The term "flat" is used here to mean a surface which is flat enough to form a SAW device thereon; in fact, the surface can be planar or curved. A respective SAW device is formed on each flat, and the two halves are reassembled into a cylinder and secured to each other, as by suitable bonding, to seal the internal cavity formed by the facing channels. Electrical leads from the SAW resonators run through the bond to an external circuit. This structure typically is mounted in a housing which allows the structure to be selectively subjected to external pressure, such as pressure from fluid which is selectively admitted in the housing. The change in the difference frequency of the two SAW devices, as between the steady states before and after the pressure was applied, is used as a measure of the pressure change. Examples of such structures are described in said commonly assigned, earlier-filed application.

An exemplary and nonlimiting use of structures of this type is in sensing downhole pressure in exploratory or producing oil wells. Stringent and often conflicting requirements are imposed on such structure by the severe downhole conditions, such as high pressure and temperature and the need to measure accurately very small pressure differentials. As one example, in evaluating and planning the exploitation of producing wells, it is sometimes desirable to change the producing rate of one well in a field (e.g., close off that wall temporarily), and to measure and time the resulting pressure changes in one or more other wells in the same field, for example in order to estimate the permeability of the subsurface formations. It will be appreciated that this requires relatively minute changes in pressure to be accurately measured under the difficult downhole conditions.

Accordingly, it would be desirable for SAW pressure sensors to provide pressure measurement capabilities with a dynamic range of about a million or more, pressure response time of the order of several seconds or less over a temperature range of 0°–125° C. or more, thermal response time which is as short as possible, and high accuracy. Stated differently, it is desirable to have a SAW pressure sensor having a pressure range of 0–10,000 psi, resolution of 0.01 psi, thermal response time of about 10 seconds or less per 100° C. step change in ambient temperature, and accuracy of 0.025% full scale. It is further desirable to exceed even these goals, and provide a structure having a pressure range exceeding 0–20,000 psi, temperature range exceeding 0°–175° C. and pressure and temperature response time on the order of a few seconds, without compromising the abovementioned resolution and accuracy.

The above-identified 1982 application discloses among other things an externally loaded SAW pressure sensor which has a cylindrical shape and an internal cavity in which two SAW resonators are formed in channels facing each other. An external circuit measures the difference frequency of the SAW resonators, and uses it as a temperature-compensated measure of the pressure on the external surface of the structure. Examples of such structures are illustrated in FIGS. 4, 5, 12, 13, 14, 15, 19, 20, 29, 30 and 33 of the commonly assigned earlier-filed application. In each of these illustrations of particular embodimemts, the SAW resonator is on a flat surface (called simply a "flat") in the bottom of a channel, and the channel sides which flank the long sides of the resonator flat are perpenicular to the flat, and are substantially straight and planar, except possibly for some rounding of sharp corners which are designed to relieve stresses at wall intersections. While the inventions claimed therein need not be limited to straight channel sidewalls, no figure of said earlier-filed application illustrates a curved sidewall immediately flanking the SAW device flat in an externally loaded structure or such walls which are at an angle relative to the flat which is substantially different from the normal.

It is believed that the structures disclosed and claimed in the 1982 application provide significant improvement over prior proposals. Still, a need remains for even greater improvements. In an effort to meet that need, it has been discovered that unexpected and highly significant improvements result from: (i) changing the structure configuration by curving or rounding the sidewall immediately flanking one or more of the respective SAW devices, or having angling that sidewall at much more than 90° relative to the flat; and/or (ii) flattening the outside surface of the sensor adjacent one of the interior flats so that the wall thicknesses at the two flats make their thermal responses better matched to each other. These improvements include an unexpected and significant increase in pressure sensitivity without significant adverse effects on stresses, and an unexpected and significant improvement in thermal response without unacceptably degrading pressure sensitivity.

Accordingly, an exemplary and nonlimiting embodiment of the invention comprises a pressure sensor in the form of a generally cylindrical body made of two halves joined along an axial plane. An axially extending channel in each half faces that of the other, and has an axially extending flat at its bottom. A respective SAW device occupies each flat. At least one of the channels can have a curved sidewall adjoining the flat or sidewalls which angle away from the long sides of the flat at an angle substantially exceeding 90°. Preferably, but not necessarily, the curved sidewall conforms to a cylindrical surface. The curved sidewall can be formed with a routing tool having a curved or a cylindrical surface. The two channels can differ in depth, such that the wall thickness of the body can be greater at one flat than at the other (at least when the sensor is being fabricated), and the flats can differ in width. The outer surface of the sensor adjacent one of the flats can be flattened, to make the thermal responses at the flats better matched without unacceptable degrading of pressure sensitivity.

In broader terms, an exemplary and nonlimiting example of the invention comprises a hollow body having at least one SAW device which is formed on its interior surface and whose frequency varies with pressure exerted on the exterior of the body. At least a substantial portion of the interior surface adjoining the SAW device can be curved, or can angle away from the SAW device at an angle substantially exceeding 90°. Preferably, the hollow body has two interior flats which are formed on the interior thereof and face each other. The SAW devices can be formed on respective interior flats. The wall thicknesses of the sensor body at the flats can be matched for better matching of thermal response as between the respective SAW devices.

A pressure sensitivity increase of the order of 50% is estimated for a particular embodiment having a curved sidewall adjacent one flat, as compared to a particular embodiment having planar sidewalls adjacent both flats, without significant increase in stresses at the flat centers. A shortening of the thermal response time by at least about one-third is estimated where the wall thicknesses of the sensor body at the flats are matched, without unacceptable degrading of pressure sensitivity or an unacceptable increase in stresses.

These and other advantages of the invention are discussed in more detail below in connection with the exemplary embodiments shown in the figures.

DETAILED DESCRIPTION

Figure 1:
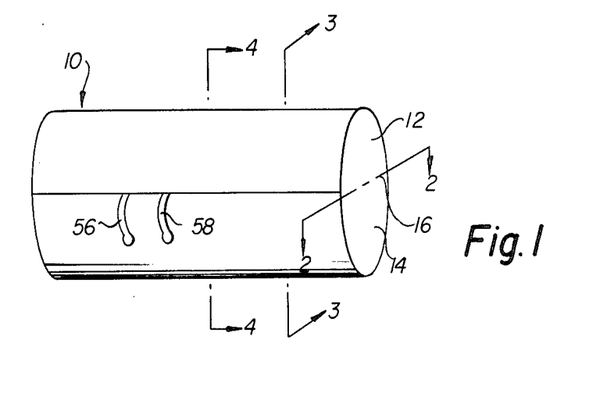
FIG. 1 is a perspective view of an externally loaded SAW device pressure sensor.
Figure 2:
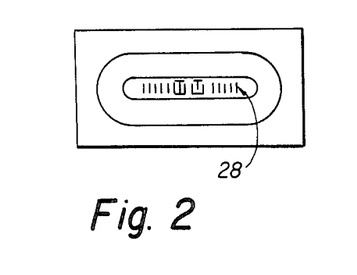
FIG. 2 is an axial sectional view taken along line 2—2 (at the axial plane at which the two halves making up the cylindrical structure of FIG. 1 are joined).
Figure 3:
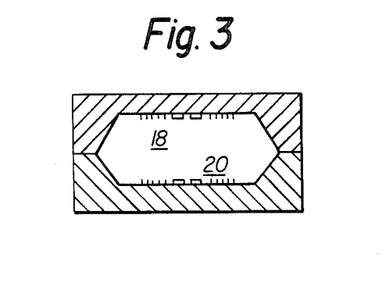
FIG. 3 is an axial sectional view taken along line 3—3 (at an axial plane perpendicular to that of FIG. 2).
Figure 4:
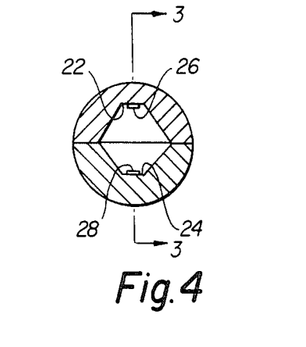
FIG. 4 is a cross-sectional view taken along line 4—4 of FIG. 1 (at a transaxial plane).
Figures 9, 10:
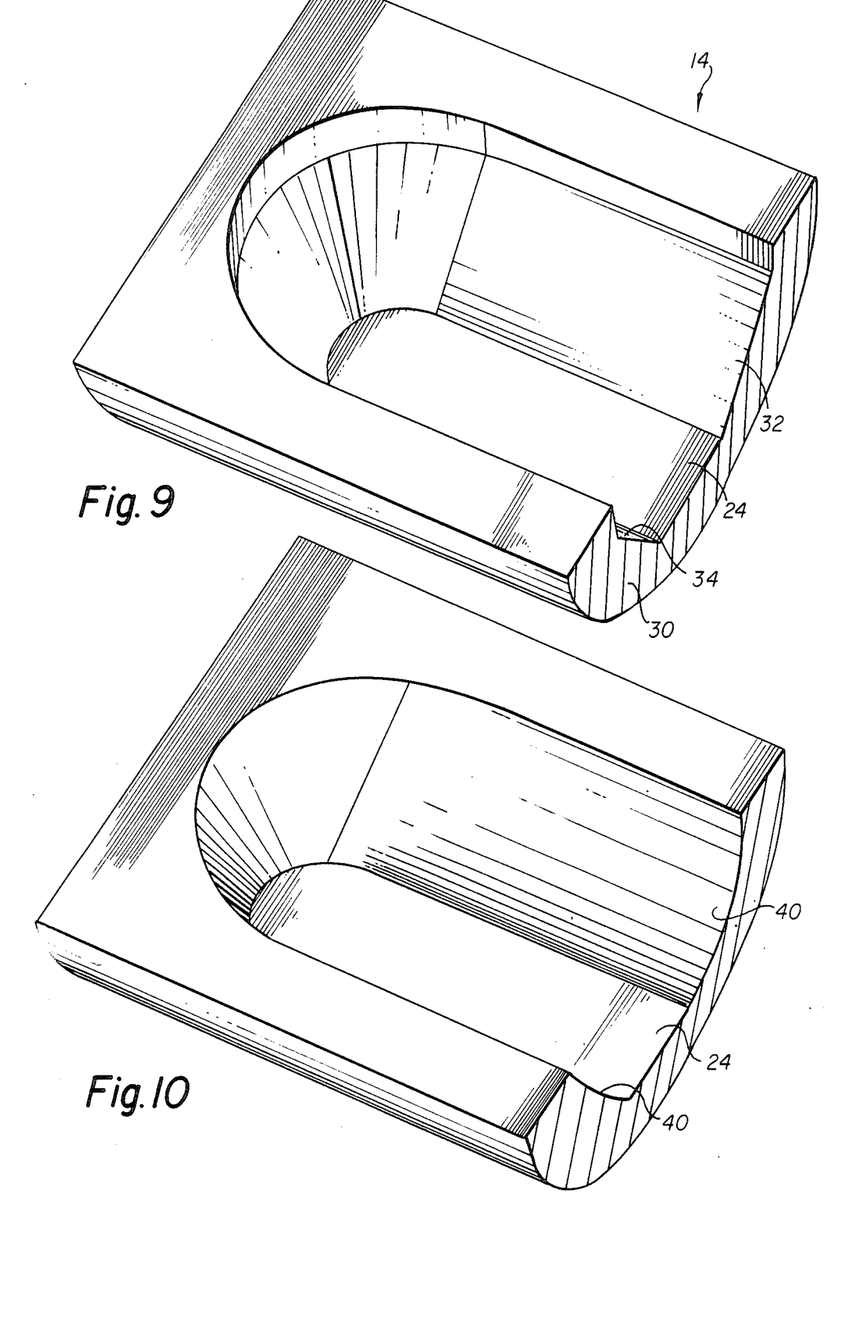
FIG. 9 is a perspective view illustrating a channel having straight sidewalls adjacent the flat.
FIG. 10 is a similar perspective view illustrating a channel having a curved sidewall adjacent the flat.

Referring to the perspective view of FIG. 1 and the sectional views of FIGS. 2, 3 and 4, an externally loaded pressure sensor generally indicated at 10 comprises a top half 12 and a bottom half 14 joined at 16 along an axial plane. An axially extending channel 18 is formed in top half 12, and a similar (but shallower) axially extending channel 20 is formed in bottom half 14. The two channels face each other, and together form a cavity sealed by the top and bottom halves 12 and 14. An axially extending top flat 22 is formed at the bottom of top channel 18, and an axially extending bottom flat 24 is formed at the bottom of channel 20. Flats 22 and 24 face each other across the cavity formed by channels 18 and 20. A top SAW resonator 26 is formed on top flat 22, and a bottom SAW resonator 28 is formed on bottom flat 24. Additional detail of the appearance of the halves making up body 10 can be gleaned from FIG. 9 which shows a perspective view of one-half of bottom half 14, the other part being substantially symmetrical with respect to the plane 30 along which bottom half 14 is cut in the view of FIG. 9. The term "substantially" is used here because, as best seen in FIG. 4, the two channels can differ in depth, and the sensor wall thicknesses at the two flats can differ. As seen in FIG. 9, bottom flat 24 is flanked on its long sides by straight (planar) sidewalls 32 and 34, which angle away from its long sides at an angle substantially greater than 90°. It can be formed (fabricated) by routing a half of a solid cylinder cut along an axial plane with a routing tool shaped in the form of a truncated cone. Top half 12 can be similarly shaped, but channels 18 and 20 can differ in depth. When channels 18 and 20 differ in depth, the top thickness (the thickness of the sensor body wall above top flat 22) can be different from the bottom thickness (the thickness of the sensor body wall below bottom flat 24). In the embodiment of FIGS. 2-4, which contains a nonlimiting example of dimensions, the thickness at the top flat is 4 millimeters and the thickness at the bottom flat is 6 millimeters. In a FIG. 5, which contains another nonlimiting example of selected dimensions, the top thickness is 5.79 millimeters and the bottom thickness is 3.17 millimeters. In each of these examples the facing flats of a given sensor have the same widths (5 millimeters in FIGS. 2-4, and 6.350 millimeters in FIG. 5). However, this need not be the case, and the flats of the same sensor can differ in width from each other.

Pressure sensors having straight (planar) walls adjacent the flats, such as illustrated in FIGS. 2-4, 5 and 9, are estimated to give highly useful results in terms of pressure sensitivity and stresses at the flat centers. For example, the sensor embodiment illustrated in FIG. 5, which differs from that illustrated in FIGS. 2-5 only in the indicated difference in measurements, gives estimated pressure sensitivity (at the flat centers) as specified in Table 1 below. In Table 1, the estimated parameter is change in SAW resonator frequency per unit change in externally applied hydrostatic pressure (Hz/psi). The column labelled t identifies the thickness of the sensor wall at the thick and the thin flats respectively. Thus, this table gives results for the dimensions shown in FIG. 5, all other dimensions being as shown in FIGS. 2-4. The column labelled t/r identifies the ratio between the thickness dimension given in the preceding column and the radius of the sensor body. The column labelled ST gives the estimated change in frequency of the respective SAW device per unit change in externally applied pressure in units of Hz/psi for an ST cut sensor. The column labelled AT gives the change in frequency per unit change in externally applied pressure for an AT cut sensor. The reference oscillator frequency for the estimates of pressure sensitivities in Table 1 is 310 MHz. Examples of techniques for applying external pressure are discussed in connection with FIG. 14 below, and examples of techniques for measuring SAW device frequency are discussed in connection with FIGS. 11-13b below, as well as in said 1982 application. The terms ST and AT are defined in greater detail in the 1982 application.

TABLE 1

Figure 5:
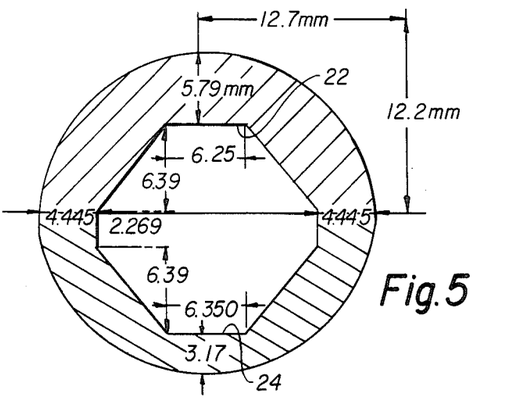
FIG. 5 is a transaxial sectional view similar to that of FIG. 4 but illustrating an embodiment using planar sidewalls adjacent the flats.

|  | t (mm) | t/r | ST (Hz/psi) | AT (Hz/psi) |
|---|---|---|---|---|
| $\Delta f/\Delta P$ | 5.79 | 0.456 | 38.0 | 20.0 |
| $\Delta f/\Delta P$ | 3.17 | 0.250 | 50.0 | 28.4 |

While the embodiments using straight (planar) sides flanking the flats, as in FIGS. 2-4, 5 and 9, give good estimated results as compared with prior proposals, it has been discovered that rounding the sidewall flanking at least one of the flats, gives unexpectedly improved results, and that the unexpected improvement is highly significant and is not accompanied by an increase in stresses which would degrade sensor performance.

Figure 6:
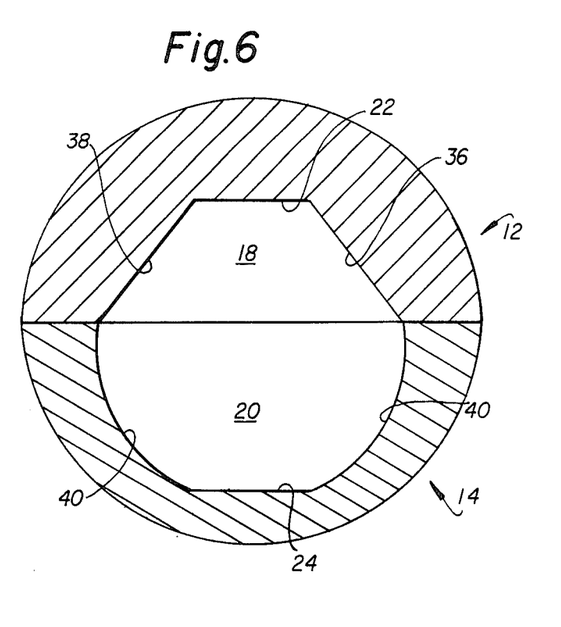
FIG. 6 is a transaxial sectional view showing an embodiment using a curved sidewall adjacent the bottom flat.

Referring as one example to FIG. 6, it is seen that top flat 22 (the thick flat) is flanked by straight side-walls 36 and 38, as in the embodiment of FIG. 5, but bottom flat 24 (the thin flat) is flanked by a curved side-wall 40 on both the right and the left sides. Bottom channel 20, which has the curved sidewall 40, can be formed in substantially the same manner as top channel 18—e.g., with a routing tool. However, the routing tool for bottom channel 20 has a bottom end which is in the shape of a hemisphere which has a flattened bottom section (to form bottom flat 24). Referring to FIG. 9 for a perspective view illustrating a sensor half having a round sidewall device, it is seen that it differs from the illustration in FIG. 9 only in that a curved sidewall 40 flanks the long sides of bottom flat 24. The sensor structure illustrated in FIG. 6 is labelled BR, shorthand for Bottom Round, to indicate that only the bottom channel 20 has a round or curved sidewall 40.

Figure 7:
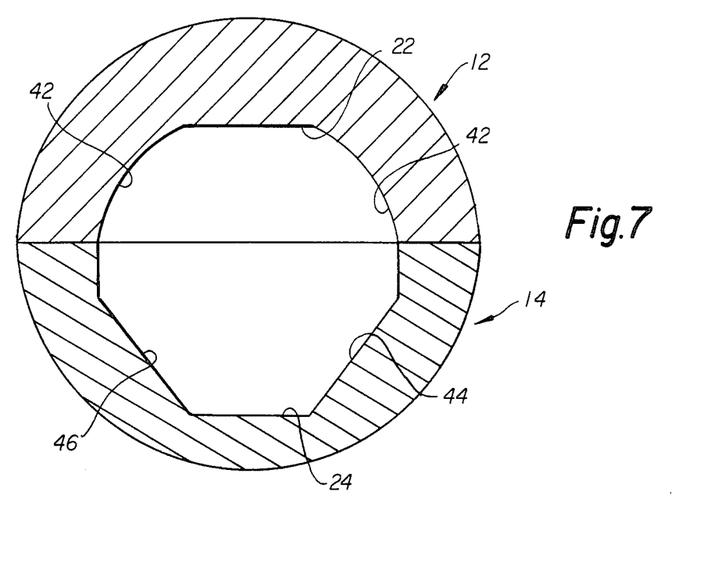
FIG. 7 is a transaxial sectional view showing an embodiment using a curved surface adjacent the top flat.

Another embodiment using a curved sidewall is illustrated in FIG. 7 and is labelled TR, short for Top Round. In FIG. 7, the top (or thick) flat 22 is flanked by a curved sidewall 42 on each of its long sides, while the bottom flat 24 is flanked by straight walls 44 and 46, as in the embodiment of FIGS. 2-5 and 9.

Figure 8:
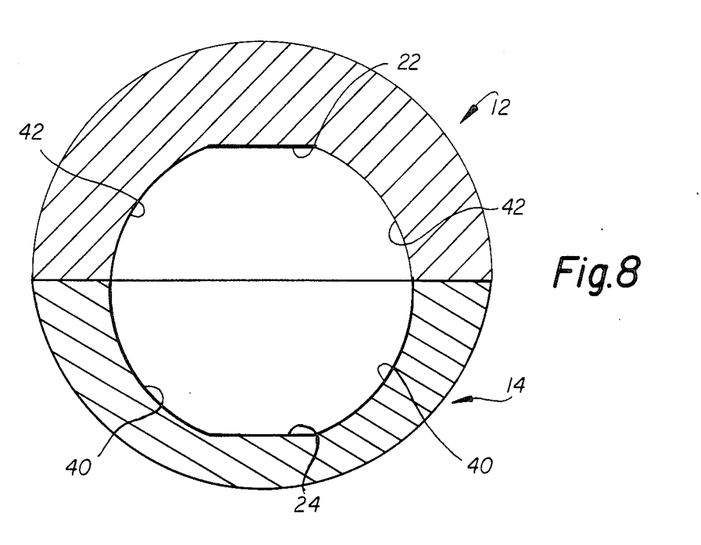
FIG. 8 is a transaxial sectional view illustrating an embodiment using curved sidewalls adjacent both the top and the bottom flats.

FIG. 8 illustrates yet another embodiment, labelled TBR, short for Top and Bottom Round. In the embodiment of FIG. 8 the bottom (or thin) flat 24 is flanked by a round sidewall 40, as in the embodiment of FIG. 6, and the top (or thick) flat 22 is flanked by a round sidewall 42, as in the embodiment of FIG. 7.

It has been discovered that, unexpectedly, the use of a round sidewall flanking at least one flat, brings about startling estimated improvements in pressure sensitivity, and that this does not degrade sensor performance by unacceptably increasing the stresses at the flat centers. Table 2 below gives the estimated pressure sensitivities at the flat centers, using the same notation as Table 1 above, and repeats the contents of Table 1 (for the pressure sensor illustrated in FIG. 5) for more convenient comparison with the estimated results thereof with those for the sensors of FIG. 8 (TBR), of FIG. 7 (TR), and of FIG. 6 (BR). The values in columns ST and AT are the changes in frequency of the respective SAW devices per unit change in externally applied pressure (in Hz/psi), using all other test parameters as in connection with Table 1.

TABLE 2

|  | t (mm) | t/r | ST (Hz/psi) | AT (Hz/psi) |
|---|---|---|---|---|
| FIG. 5 |  |  |  |  |
| $\Delta f/\Delta P$ | 5.79 | 0.456 | 38.0 | 20.0 |
| $\Delta f/\Delta P$ | 3.17 | 0.250 | 50.0 | 28.4 |
| TBR (FIG. 8) |  |  |  |  |
| $\Delta f/\Delta P$ | 5.79 | 0.456 | 38.9 | 24.8 |
| $\Delta f/\Delta P$ | 3.17 | 0.250 | 54.7 | 39.2 |
| TR (FIG. 7) |  |  |  |  |
| $\Delta f/\Delta P$ | 5.79 | 0.456 | 39.1 | 25.4 |
| $\Delta f/\Delta P$ | 3.17 | 0.250 | 50.5 | 27.1 |
| BR (FIG. 6) |  |  |  |  |
| $\Delta f/\Delta P$ | 5.79 | 0.456 | 37.9 | 19.6 |
| $\Delta f/\Delta P$ | 3.17 | 0.250 | 54.2 | 41.6 |

It is seen in Table 2 that the changes in SAW device frequency per unit change in pressure for the two flats of sensor BR (FIG. 6) have the largest contrast, and that this holds true for both the ST and the AT cut. With straight (planar) sidewalls adjacent both flats, as in FIG. 5, the estimated differential pressure sensitivity is 12 Hz/psi for the ST cut. This changes to 15.8 for the TBR sensor of FIG. 8, where both the top and the bottom flats are flanked by the curved (spherical) sidewalls, and to 16.3 for the BR sensor of FIG. 6, where the bottom flat is flanked by a curved sidewall and the top flat is flanked by straight sidewalls. Similar improvement in estimated differential pressure sensitivity is noted for the AT cut: 8.4 for the sensor with straight sidewalls adjacent both flats (as in FIG. 5), 14.4 for the TBR sensor of FIG. 8 (with curved sidewalls adjacent both flats), and 22 for the BR sensor of FIG. 6 (with a curved sidewall adjacent the bottom flat and straight sidewalls adjacent the top flat). For the ST cut, a decrease in differential sensitivity as compared with the sensor of FIG. 5 (having straight walls adjacent both flats), is noted for the TR sensor of FIG. 7 (having a curved sidewall adjacent the top flat and straight sidewalls adjacent the bottom flat), but a very substantial increase in sensitivity is noted for the BR sensor of FIG. 6. It can be further estimated from these results that a sensor made from a crystal cut so that the flats are between an ST cut and an AT cut, should show an improvement in differential sensitivity of the order of 50% for the BR configuration as compared to a configuration such as in FIGS. 2–5 and 9.

The unexpected and startling increase in estimated pressure sensitivity brought about by rounding the sidewall adjacent to at least one of the flats, comes without significant concomitant increase in stresses at the centers of the flats, as is evident from the estimated results given in Table 3 below for the configuration illustrated in FIG. 5 as compared to other configurations discussed in connection with Table 2. The normalized stress, sigma, is given for the zz direction, which is the axial direction (along the cylindrical axis) and for the theta-theta direction, which is the hoop stress direction. In each case the stress is per psi of externally applied pressure. The remaining notation in Table 3 is the same as in Table 2. Unexpectedly, despite the thinner sensor body wall associated with the curved sidewall, there is no significant increase in stresses for either the ST or the AT cut. Thus, no significant sacrifice in strength of the sensor is made in order to secure the startling increase in estimated pressure sensitivity.

TABLE 3

|  | t (mm) | t/r | ST | AT |
| --- | --- | --- | --- | --- |
| FIG. 5 | | | | |
| axial stress | 5.79 | 0.456 | −1.66 | −1.62 |
| hoop stress | 5.79 | 0.456 | −2.26 | −2.25 |
| axial stress | 3.17 | 0.250 | −2.16 | −2.13 |
| hoop stress | 3.17 | 0.250 | −2.88 | −2.84 |
| TBR (FIG. 8) | | | | |
| axial stress | 5.79 | 0.456 | −1.59 | −1.57 |
| hoop stress | 5.79 | 0.456 | −1.90 | −1.87 |
| axial stress | 3.17 | 0.250 | −2.06 | −2.03 |
| axial stress | 3.17 | 0.250 | −2.00 | −2.00 |
| TR (FIG. 7) | | | | |
| axial stress | 5.79 | 0.456 | −1.57 | −1.54 |
| hoop stress | 5.79 | 0.456 | −1.80 | −1.77 |
| axial stress | 3.17 | 0.250 | −2.23 | −2.20 |
| hoop stress | 3.17 | 0.250 | −3.09 | −3.06 |
| BR (FIG. 6) | | | | |
| axial stress | 5.79 | 0.456 | −1.68 | −1.65 |
| hoop stress | 5.79 | 0.456 | −2.35 | −2.34 |
| axial stress | 3.17 | 0.250 | −1.99 | −1.96 |

TABLE 3-continued

|  | t (mm) | t/r | ST | AT |
| --- | --- | --- | --- | --- |
| hoop stress | 3.17 | 0.250 | −1.79 | −1.72 |

Figure 11:
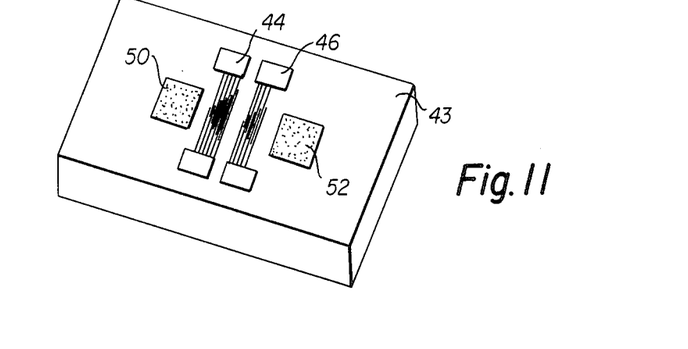
FIG. 11 is a perspective view illustrating major components of a SAW resonator.

Each of resonators 26 and 28 can be of the type illustrated in FIG. 11, and can comprise surface wave interdigital transducers 44 and 46 deposited on the highly polished surface 48 of the respective flat, and surface wave grating reflectors 50 and 52 formed on the surface of the respective flat, in accordance with known technology and as discussed in said 1982 application. The surface wave propagates along the long dimension of the flat and parallel to the cylinder axis of sensor body 10.

Figure 12:
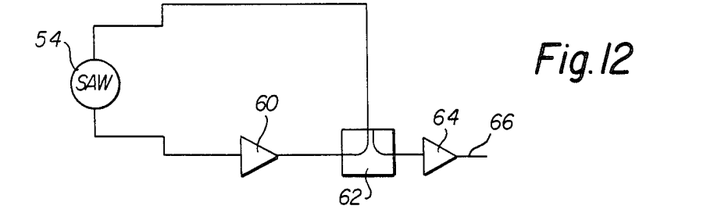
FIG. 12 is a block diagram illustrating major components of a SAW resonator and an external circuit therefor.

Referring to FIG. 12, which is a simplified block diagram of a SAW resonator of the type illustrated in FIG. 11 and of the circuitry for driving it and for providing an output, a SAW resonator is schematically illustrated at 54 and has outputs connected via leads such as 56 and 58 in FIG. 1. The leads pass through the sealed joint between top and bottom halves 12 and 14, and can be suitably connected to an external circuit board. As shown in FIG. 12, the external circuit board can include a loop amplifier 60, a directional coupler or power splitter 62 and an output buffer amplifier 64 which provides, at an output line 66, a signal at a frequency determined by the properties of SAW resonator 54. These properties in turn depend on changes due to applied pressure on the sensor body.

Figure 13A:
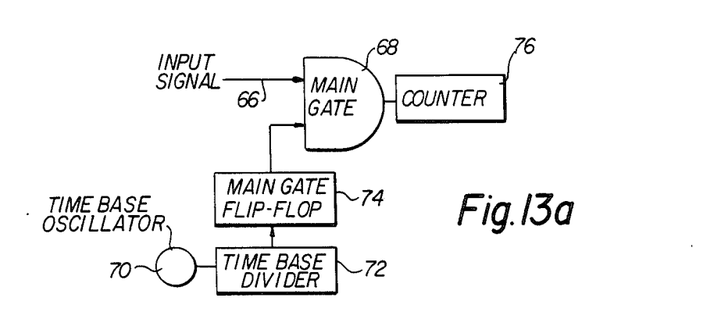
FIG. 13a is a block diagram illustrating a technique for direct counting of a SAW oscillator frequency.
Figure 13B:
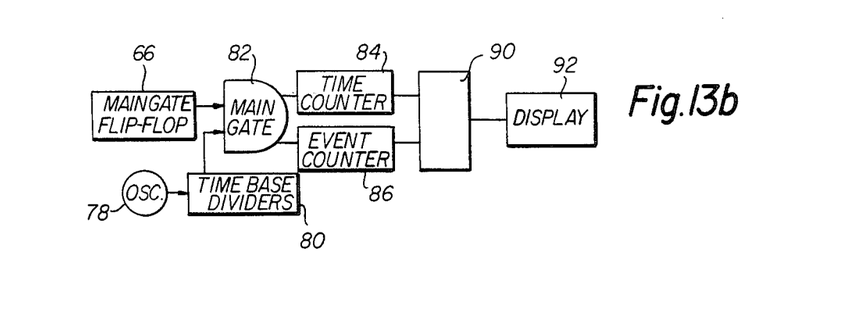
FIG. 13b is a block diagram of a period measurement technique for measuring a SAW oscillator frequency.

FIGS. 13a and 13b illustrate two known methods of measuring the frequency of the output signal of a circuit such as illustrated in FIG. 12. In the direct counting method of FIG. 13a one input signal to main gate 68 is the output 66 of output buffer amplifier 64 in FIG. 12. The other input of main gate 16 comes from a time base oscillator 70 whose output is time-base divided by divider 72 and fed to main gate 68 through main gate flip fop 64. The output of main gate 68 is counted in counter 76. In operation, counter 76 counts the number of cycles of the input signal 66 allowed through main gate 68 in a time interval determined by the time base oscillator/divider and main gate flip flop. In a period measurement circuit of the type shown in FIG. 13b, the input signal such as the output 66 of output buffer amplifier 64 in FIG. 12, opens a main gate 82 for a number of input cycles N(i), and the number of cycles of the time base n(t) is counted. The time base comes from a time base oscillator 78 whose output passes through time base dividers 80 before becoming the second input to main gate 82. The frequency of input signal 66 is computed from the ratio of input cycles N(i) to the product of the number of cycles of the time base n(t) multiplied by the period t(c) of the time base. In essence, what is measured is the number of periods of the time base required to allow a number of input cycles to pass the main gate. The time per input cycle (the period of the signal) is calculated, and then its reciprocal is computed to give the measured time base frequency. The number of time base cycles is counted in time counter 84, and the number of input cycles is counted in event counter 86. The required product and ratio are found in arithmetic circuits 90 and the result is displayed at display 92.

Figure 14:
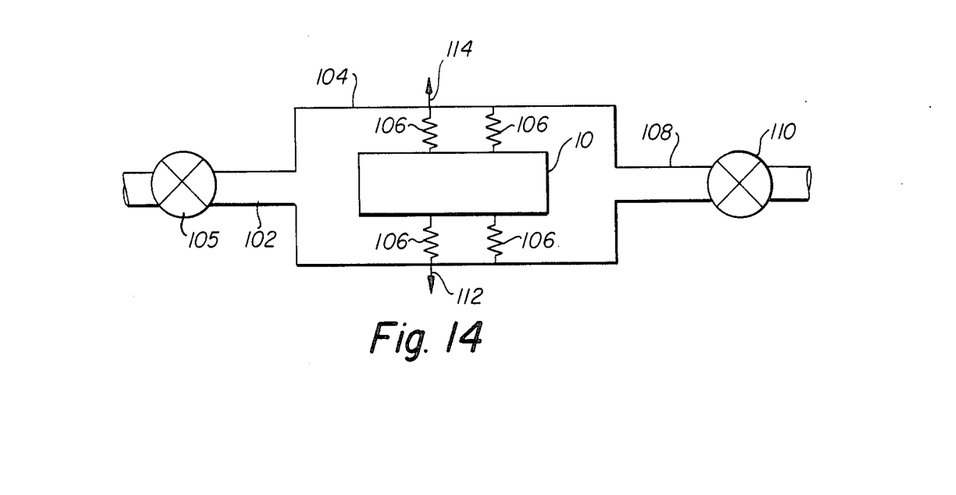
FIG. 14 is a schematic illustration of a housing in which an externally loaded SAW structure is mounted for hydrostatic pressure measurements.

An exemplary arrangement for using a sensor 10 for hydrostatic pressure measurements is illustrated in FIG. 14. It comprises an input valve 100 which can selectively open a conduit 102 to supply fluid under pressure to a housing 104 in which a pressure sensor 10 is suitably supported by isolation supports 106. The electrical connections to sensor 10 are through leads 112 and 114 connected to external circuits for measuring the frequency of SAW devices in sensor 10, such as circuits of the type discussed in connection with FIGS. 13a and 13b. The pressure within housing 104 can be relieved by evacuating the fluid therein through an outlet conduit 108 controlled by output valve 110. As an alternative, only one port can be provided, and the sensor body can be mounted by means of a resilient support extending along the cylindrical axis of the sensor body, with the electrical leads leaving the housing through the wall opposite that through which liquid is admitted in the housing. Because any of a number of different housings can be used, and because what is important is the presence of a housing rather than the particular details thereof, it is believed that no further description of a particular housing is needed to make and use the claimed invention.

Figure 14A:
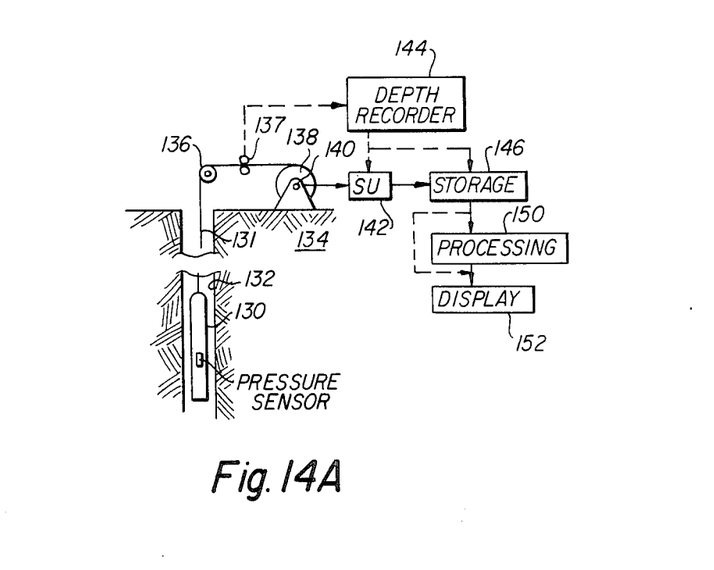
FIG. 14a illustrates the use of a sensor in well logging.

FIG. 14a illustrates the incorporation of a sensor of the type described here in a logging tool system. A sensor of the type described in connection with FIGS. 1-10, 15, and 19-22 is secured in a housing such as described in connection with FIG. 14 and is mounted in a logging tool 130, which is supported by cable 131 in borehole 132 drilled in subsurface formation 134. Cable 131 passes over a sheave wheel 136 and is secured to a drum-and-winch mechanism 138. Mechanism 138 includes a suitable brush and slip-ring arrangement 140 for providing electrical connections between electrical conductors in cable 131 and a surface unit 142 which supplies power and control signals to logging tool 130 and the sensor mounted therein. A circuit such as discussed in connection with FIGS. 12-13b can be mounted inside tool 130 and operated under the control of surface unit 142 to send up, through cable 131, signals indicative of the pressure measured by the sensor. If desired, a code converter can be included in tool 130 to convert the sensor output to a digital signal in a desired code and format. A wheel 137 engages cable 131 and is linked with a depth recorder 144, which records the bore-hole depth at which a given pressure measurement is taken. A storage 146 receives the pressure measurements from surface unit 142 and the corresponding depth measurements from depth recorder 144, and stores them for future use. These measurements can be processed in unit 150, for example to filter out noise or other undesired signal components. The pressure/depth measurements can be displayed at unit 152 either before or after processing at 150.

The invented sensors having a curved wall adjacent a SAW device (as in FIGS. 6-8) can be fabricated using substantially the same techniques used in the case of the sensors described in said earlier-filed application. The differences of substance are those related to forming the needed curved sidewall(s). As noted, one exemplary way to do this is to use a routing tool which is not cone-shaped, as in the earlier-filed application, but is spherical or has an otherwise curved cutting surface, depending on the desired curvature of the sidewall adjacent the particular SAW device. For example, the sidewall adjacent the long sides of a flat can be parabolic, or can have some other curvature in transaxial section, so long as the desired result is achieved of improved pressure sensitivity without unacceptable degrading in terms of increased stresses. It should be appreciated that while in the illustrated embodiments the SAW devices are shown formed on the planar bottoms of the grooves, and the term "flat" has been used, it is within the scope of this invention to form at least one of the SAW devices on a curved interior surface. For example, at least one of the channels can be continuously curved in transaxial cross-section, and the SAW device can be formed on the curved bottom portion thereof rather than on a planar surface, as in the drawings discussed above. Thus, the term "flat" is used in this application to mean the surface on which the SAW device is formed, which surface can be flat or curved or partly flat and partly curved. In addition, it should be appreciated that while in the drawings discussed above the SAW devices extend along the axial direction, it can be advantageous in some cases to have the SAW device extend along a direction which is at an angle with the cylindrical axis of the sensor body, and that this is within the scope of this invention. It should be clear that directional terms such as top, bottom and left and right refer to a particular orientation of a sensor, and are not meant as a limitation on the way in which the sensor can be oriented in actual use. Numerous variations other than those expressly discussed above are within the scope of the invention; accordingly, the invention is not limited to the specific examples discussed above, but includes all subject matter encompassed by the appended claims.

As earlier noted, one of the desirable characteristics of sensors of the type discussed above is a short thermal response time. It will be appreciated that in the sensors illustrated in the drawings of this application two SAW devices are used per sensor, and that the difference between the frequencies thereof (at steady state at a given external pressure) is used as a measure of the external pressure applied to the sensor. It is believed that, as compared with a sensor using only one SAW device, this reduces pressure sensitivity by a factor of about two, but also reduces temperature sensitivity by a factor of about ten, thus making the invented sensor significantly less subject to error due to temperature variations. Still, it is estimated that the exemplary sensors illustrated in FIGS. 1-14 have thermal response characteristics which necessitate a period of thermal stabilization between pressure measurements, in order to allow the sensor to reach a steady state, particularly in the harsh environment of well logging.

Figure 16:
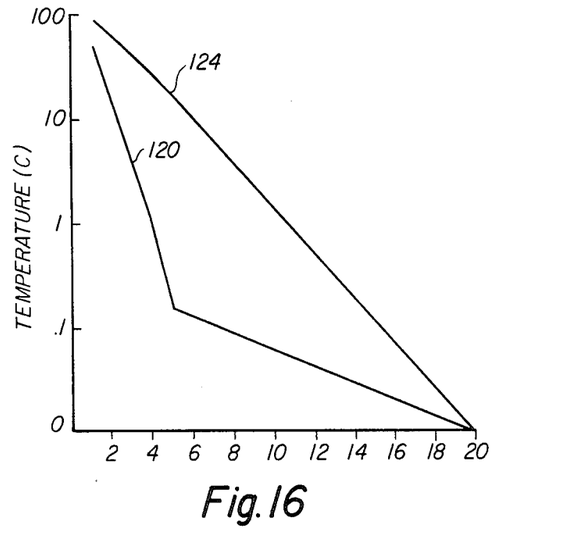
FIG. 16 is a graph illustrating the estimated thermal response of a sensor having planar sidewalls adjacent the flats and different wall thicknesses at the flats, as illustrated in FIGS. 1-5.
Figure 17:
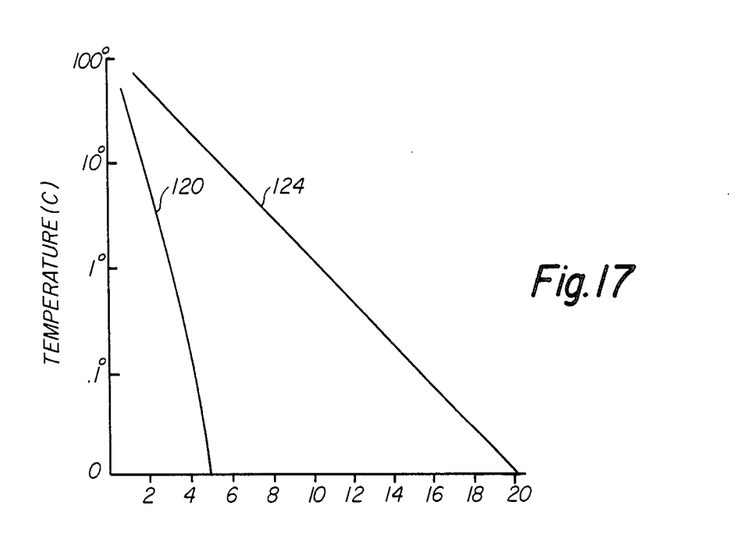
FIG. 17 is a graph illustrating the estimated thermal response of a sensor having a curved sidewall adjacent each flat and different wall thicknesses at the flats, as illustrated in FIG. 8 (TBR).

The estimated thermal response time of a sensor having the configuration illustrated in FIG. 5, is given in the plot of FIG. 16, where the horizontal axis is time in seconds and the vertical axis is temperature, in degrees Centigrade on a logarithmic scale. Curve 120 in FIG. 16 shows the difference between the temperatures at the thin flat 24 (FIG. 5) and at the exterior surface of the sensor immediately below flat 24 in response to a 100° C. step change in the surface temperature at time zero. Similarly, curve 124 in FIG. 16 shows the difference between the temperature at thick flat 22 and at the exterior surface of the sensor immediately above flat 22 in response to the same step change in surface temperature. It is seen that in this example the extimated time for the difference temperature at the thin flat to reach 0.1° C. is about 8 seconds and the estimated time for the difference temperature for the thick flat to reach 0.1° C. is about 15 seconds. FIG. 17 is the same type of a plot as FIG. 16, but is for the rounded interior wall configuration illustrated in FIG. 8. As seen in FIG. 17, the time for the temperature difference at the thin flat to drop down to 0.1° C. is reduced to about 5 seconds, but the time for the temperature difference at the thick flat to drop down to the same value is still about 15 seconds. Thus, the overall thermal response of the sensor is largely unchanged.

It has been discovered that, unexpectedly, the thermal response time of a sensor can be improved significantly without unacceptable adverse effects in other parameters, by thinning out the body wall at one of the SAW devices, as by flattening the exterior of the sensor, so as to better match the thermal responses of the two SAW devices. It has been discovered that, unexpectedly, this does not cause unacceptable reductions in pressure sensitivity or unacceptable increase in stresses.

Figure 15:
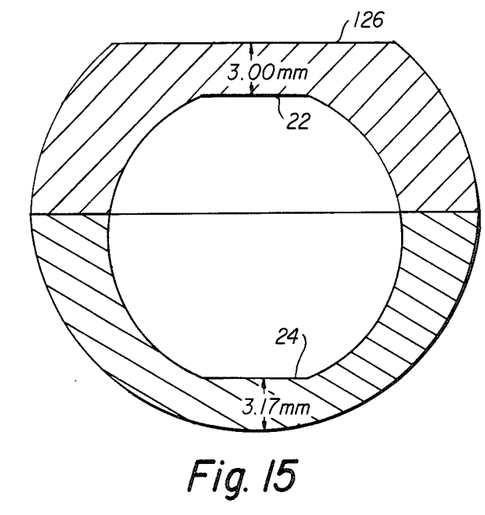
FIG. 15 is a transaxial sectional view similar to that in FIG. 8 but illustrating a sensor with an external surface flattened to improve thermal response matching without unacceptably degrading pressure sensitivity or increasing stresses.

FIG. 15 illustrates one example of an embodiment of the invention which brings about significant and unexpected improvements in thermal response time without unacceptably degrading other parameters. The sensor illustrated at FIG. 15 is otherwise identical to that illustratd in FIG. 8 (and has its other dimensions identical to those illustrated in FIGS. 3-5) but has an exterior "flat" at 126. The term "flat" is used here to denote a flattening of or a reduction in the curvature of the sensor exterior which results in reducing the sensor body thickness at an interior flat, and the term "thickness" is used in this context to mean the distance between the center of an interior flat and the nearest point on the exterior surface of the sensor. Thus, the exterior "flat" may, but need not be, planar, and it is within the scope of this invention to have an exterior "flat" which conforms to a curved surface. An exterior flat such as at 126 in FIG. 15 can be formed, for example, by shaving off or grinding the exterior surface of the sensor body to form a flat plane parallel to the thick flat 22. Due to this exterior flat 126, the radial thicknesses of the sensor body at the thick and the thin flats 22 and 24 are approximately the same. The thickness of the sensor body at the thick flat 22 is, in this example, 3.00 mm, and the thickness of the sensor body at the thin flat 24 is, in this example, 3.17 mm.

Figure 18:
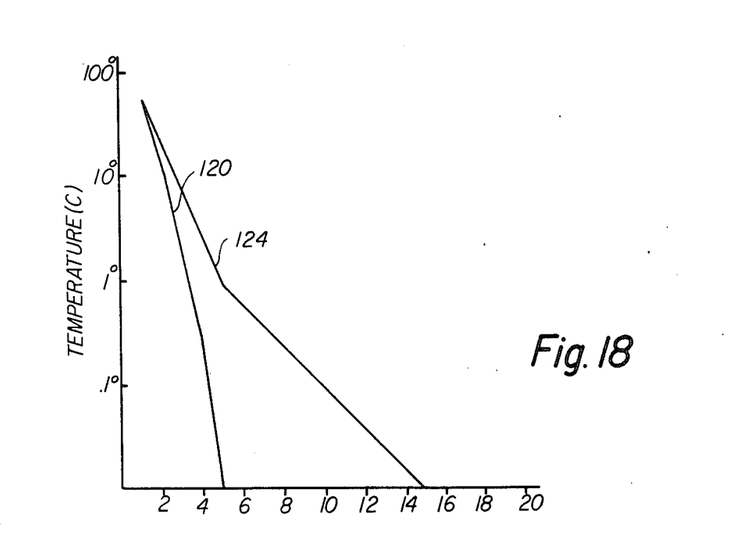
FIG. 18 is a graph illustrating the improved estimated thermal response of a sensor which, as illustrated in FIG. 15, has a flattened external surface at one of the flats, to make the wall thicknesses of the sensor body at the flats nearly equal.

In FIG. 18, graph 120 shows the estimated thermal response time for the thin flat 24 of the configuration of FIG. 15. This graph 120 is about the same as that in FIG. 17, which is for the configuration of FIG. 8. However, graph 124 in FIG. 18 shows a significantly shorter estimated thermal response time for the thick flat 22 in the configuration of FIG. 15. Now it takes about 10 seconds for the temperature difference to drop down to 0.1° C. rather than the 15 seconds it took for the other configurations (as seen in FIGS. 16 and 17). This translates to an estimated shortening of the thermal response time by about one-third.

Figures 19, 20, 21:
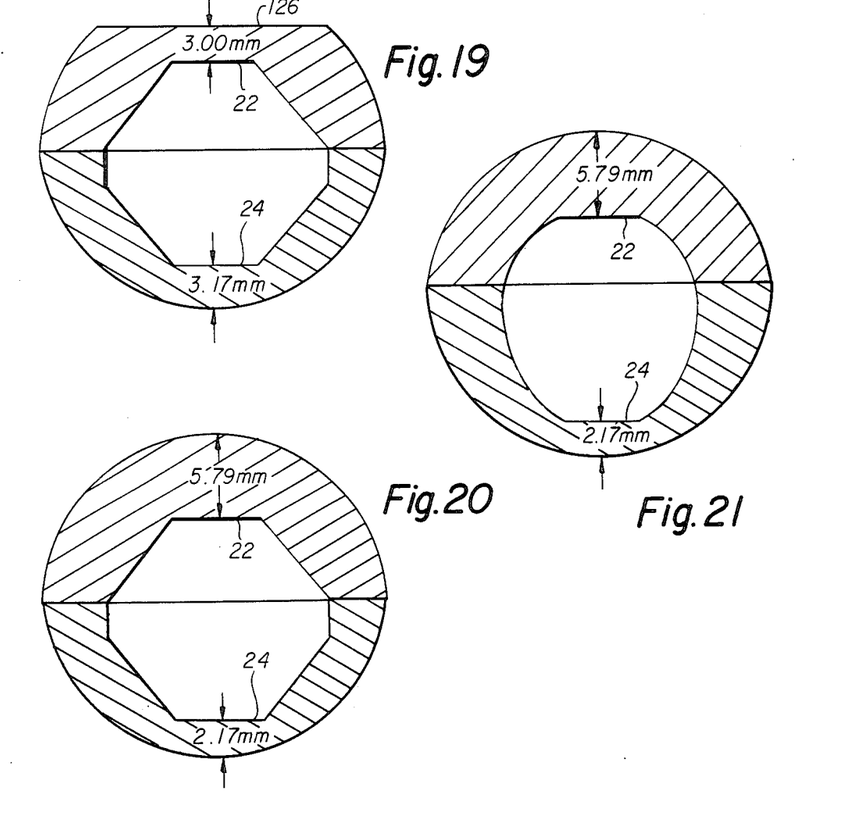
FIGS. 19-22 are transaxial cross-sectional views of sensors having alternate configurations.
Figure 22:
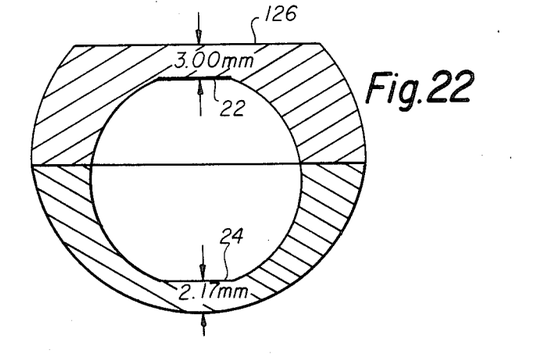

The unexpected significant improvement in thermal response time due to thinning of the sensor wall at the thick flat is of benefit in each of the various sensor configurations discussed earlier. Some of those are illustrated in FIGS. 19-22. In FIG. 19, the configuration is similar to that in FIG. 5 but an exterior flat 126 is formed at the thick flat 22, to reduce the radial thickness of the sensor wall at the thick (top) flat 22 to 3 mm. In FIG. 20 the configuration is similar to that in FIG. 5 but the radial thickness of the sensor body at the thin flat 24 is 1 mm less—it is 2.17 mm rather than 3.17 mm. In FIG. 21 the configuration is similar to that in FIG. 8, but again the radial thickness of the sensor body at the thin flat 24 is 1 mm less. FIG. 22 shows a configuration similar to that in FIG. 21, but with an exterior flat 126, which reduces the sensor wall thickness at the thick flat 22 to 3.00 mm from the 5.79 mm shown in FIG. 21.

The configurations in FIGS. 15, 19, 20 and 22 have improved (reduced) thermal response times as compared with the corresponding configurations which have a fully circular transaxial cross-section. As earlier noted, one of the important unexpected benefits of the aspect of the invention concerned with reducing thermal response time, is that there is no unacceptable increase in stresses or decrease in pressure sensitivity. This is confirmed by the estimated results given in Table 4 below.

TABLE 4

| Sensor Configuration | Normalized Axial Stress | Normalized Hoop Stress | Pressure Sensitivity In Hz/psi | Sensor Wall Thickness At Flat, In mm. |
|---|---|---|---|---|
| A All Straight Sidewalls | | | | |
| Top Flat | −1.65 | −2.26 | 37.62 | 5.79 |
| Bottom Flat | −2.12 | −2.88 | 50.34 | 3.17 |
| B All Round Sidewalls | | | | |
| Top Flat | −1.59 | −1.87 | 39.15 | 5.79 |
| Bottom Flat | −2.06 | −1.99 | 54.83 | 3.17 |
| C All Straight Sidewalls; External Flat | | | | |
| Top Flat | −1.35 | −1.58 | 33.18 | 3.00 |
| Bottom Flat | −2.21 | −2.77 | 52.63 | 3.17 |
| D All Round Sidewalls; External Flat | | | | |
| Top Flat | −1.11 | −0.62 | 33.55 | 3.00 |
| Bottom Flat | −2.09 | −1.91 | 56.61 | 3.17 |
| E All Sraight Sidewalls | | | | |
| Top Flat | −1.73 | −2.51 | 38.18 | 5.79 |
| Bottom Flat | −2.64 | −3.54 | 60.91 | 2.17 |
| F All Round Sidewalls | | | | |
| Top Flat | −1.67 | −2.11 | 39.74 | 5.79 |
| Bottom Flat | −2.53 | −2.02 | 71.27 | 2.17 |
| G All Round Sidewalls; External Flat | | | | |
| Top Flat | −1.15 | −0.87 | 32.90 | 3.00 |
| Bottom Flat | −2.68 | −1.96 | 77.18 | 2.17 |

Portion A of Table 4 gives results for a configuration as in FIG. 5; portion B of Table 4 gives results for a configuration as in FIG. 8; portion C of Table 4 gives results for a configuration as in FIG. 19; portion D gives results for a configuration as in FIG. 15; portion E gives results for a configuration as in FIG. 20; portion F gives results for a configuration as in FIG. 21; and portion G of Table 4 gives results for a configuration as in FIG. 22. The colum labelled Normalized Axial Stress in Table 4 gives the estimated stresses at the centers of the respective flats. The column labelled Normalized Hoop Stress in Table 4 gives the estimated hoop stresses at the centers of the flats. The column labelled Pressure Sensitivity gives the change in frequency of the respective SAW devices per unit change in externally applied pressure, in Hz/psi. The column labelled Sensor Wall Thickness At Flat gives the thickness, in millimeters, measured from the center of the respective flat to the nearest point on the exterior surface of the sensor body.

As seen from a comparison of portions A and C of Table 4, forming an external flat 126 as in FIG. 19 does not significantly increase axial or hoop stresses as compared to a configuration similar to that of FIG. 5, and indeed brings about an increase in pressure sensitivity, while at the same time significantly reducing the thermal response time. Similar conclusions are reached by comparing portions B and D of Table 4 as well as by comparing portions F and G. Although not shown in Table 4, an improvement correponding to that in going from portion F to portion G, is expected if an external flat is formed on the configuration referred to in portion E of Table 4.

We claim:

1. A pressure sensor comprising:
   a generally cylindrical body made of two halves joined along an axial plane;
   an axially extending channel formed in each half to face that of the other, each channel having a bottom and walls, said channels forming a sealed cavity enclosed by said body;
   an axially extending flat formed at the bottom of each channel; and
   a respective SAW device formed on each flat;
   wherein one of the halves has a flat exterior surface which reduces the radial thickness of the body adjacent the flat to thereby make the thermal responses of the two SAW devices more equal than in the absence of said exterior flat surface.

2. A sensor as in claim 1 in which the channel walls flanking at least one of the SAW devices are curved in transaxial cross-section.

3. A sensor as in claim 2 in which the channel walls flanking both SAW devices are curved in transaxial cross-section.

4. A sensor as in claim 1 in which the channel walls form a polygon in transaxial cross-section of the body.

5. A sensor as in claim 4 in which said polygon is an octagon.

6. A sensor as in claim 4 in which the sides of the polygon vary in length.

7. A sensor as in claim 1 in which the radial thickness of the body adjacent the respective flats is about the same.

8. A pressure sensor comprising:
   a generally cylindrical body having a sealed cavity which has a cavity wall; and
   at least two SAW devices formed on said cavity wall;
   wherein said body has an exterior flat radially adjacent to one of said SAW devices.

9. A sensor as in claim 8 in which the SAW devices are formed at respective flats at the cavity wall.

10. A sensor as in claim 8 in which the cavity wall is generally curved in transaxial cross-section through the SAW devices.

11. A sensor as in claim 8 in which the cavity wall is generally polygonal in transaxial cross-section through the SAW devices.

12. A sensor as in claim 8 in which the cavity wall adjacent at least one of the SAW devices is curved in transaxial cross-section.

13. A sensor as in claim 8 in which the radial thickness of the body at the respective SAW devices is about the same.

14. A sensor as in claim 8 in which the SAW devices are at different radial distances from the axis of the sensor body.

15. A sensor as in claim 14 in which the radial thicknesses of the sensor body at the respective SAW devices differ from each other by less than 50%.

16. A pressure sensor system comprising:
   a sensor body enclosing a sealed cavity which has a cavity wall;
   at least two SAW devices coupled with the cavity wall and having frequency characteristics which vary with pressure externally applied on the sensor body, said variation differing as between respective SAW devices;
   wherein the thicknesses of the sensor body at the respective SAW devices are matched to reduce the difference between the respective thermal response times of said devices;
   a well logging tool and means for mounting the sensor body therein; and
   means for logging the pressure in a borehole with said tool and sensor body.

17. A system as in claim 16 in which the respective thicknesses of the sensor body at the SAW devices are approximately the same.

18. A system as in claim 16 in which the sensor body has a generally cylindrical shape, but has an external flat adjacent a selected SAW device which reduces the thickness of the sensor body adjacent the selected SAW device as compared to the thickness for a fully cylindrical sensor body.

* * * * *